US012391313B2

United States Patent
Barrios-Albert et al.

(10) Patent No.: US 12,391,313 B2
(45) Date of Patent: Aug. 19, 2025

(54) VEHICLE FRAME WITH INTEGRAL IMPACT MITIGATION FEATURES

(71) Applicant: Rivian IP Holdings, LLC, Irvine, CA (US)

(72) Inventors: Jorge Guillermos Barrios-Albert, Farmington Hills, MI (US); Vamsi Charan Pulugurtha, Aliso Viejo, CA (US); Mukund Ganapathy, Milpitas, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 613 days.

(21) Appl. No.: 17/852,107

(22) Filed: Jun. 28, 2022

(65) Prior Publication Data

US 2023/0030279 A1 Feb. 2, 2023

Related U.S. Application Data

(60) Provisional application No. 63/226,894, filed on Jul. 29, 2021.

(51) Int. Cl.
*B62D 21/15* (2006.01)
*B60K 1/04* (2019.01)

(52) U.S. Cl.
CPC .............. *B62D 21/152* (2013.01); *B60K 1/04* (2013.01)

(58) Field of Classification Search
None
See application file for complete search history.

(56) References Cited

U.S. PATENT DOCUMENTS

| | | | | |
|---|---|---|---|---|
| 4,684,151 A | * | 8/1987 | Drewek ............... | B62D 21/152 296/187.03 |
| 5,381,871 A | * | 1/1995 | Ohta .................... | B62D 21/155 296/187.11 |
| 6,039,351 A | * | 3/2000 | Jones ................... | B62D 25/087 180/359 |
| 6,120,060 A | * | 9/2000 | Kocer ................... | B62D 21/11 280/124.109 |
| 6,502,848 B1 | * | 1/2003 | Chou .................... | B60D 1/488 280/491.5 |
| 7,971,896 B2 | * | 7/2011 | Hughes ................. | B60D 1/485 280/495 |
| 8,657,364 B2 | * | 2/2014 | Yamada ............... | B62D 21/152 296/187.11 |

(Continued)

OTHER PUBLICATIONS

Smirnov, A., "2016 Nissan Titan—Almost Everything You Ever Wanted to Know [Video]", TFLTruck, Retrieved from: https://tfltruck.com/2015/01/2016-nissan-titan-almost-everything-you-ever-wanted-to-know-video/, Jan. 15, 2015, 2 pages.

*Primary Examiner* — Joseph D. Pape
(74) *Attorney, Agent, or Firm* — Haley Guiliano LLP (57) ABSTRACT

Systems and methods are presented herein for a vehicle frame comprising a first rail member and a second rail member. Each of the first rail member and the second rail member comprise a front rail portion, wherein the front rail portion is configured to provide resistance to deformation to protect a battery pack assembly positioned between the first rail member and the second rail member. Additionally, each of the first rail member and the second rail member comprise a rail portion, wherein the rail portion is structured to mechanically deform when subjected to a threshold impact force.

18 Claims, 8 Drawing Sheets

(56) References Cited

U.S. PATENT DOCUMENTS

| | | | |
|---|---|---|---|
| 10,308,201 B2* | 6/2019 | Newcomb | B62D 25/08 |
| 10,647,359 B2* | 5/2020 | Viaux | B62D 65/02 |
| 10,836,435 B2* | 11/2020 | Tatsuwaki | B62D 25/08 |
| 2006/0197300 A1* | 9/2006 | Nakashima | B60G 7/006 |
| | | | 180/311 |
| 2011/0175401 A1 | 7/2011 | Fujimura | |
| 2012/0125702 A1* | 5/2012 | Bergfjord | B60K 1/04 |
| | | | 429/163 |
| 2018/0361454 A1 | 12/2018 | Sohmshetty et al. | |
| 2018/0362089 A1 | 12/2018 | Viaux | |
| 2021/0300477 A1* | 9/2021 | Kubota | B62D 25/087 |

\* cited by examiner

VEHICLE FRAME WITH INTEGRAL IMPACT MITIGATION FEATURES

CROSS-REFERENCE TO RELATED APPLICATIONS

This application claims the benefit of U.S. Provisional Patent Application No. 63/226,894 filed Jul. 29, 2021, the disclosure of which is hereby incorporated by reference herein in its entirety.

INTRODUCTION

The present disclosure is directed to a vehicle frame with integrated impact mitigation features, and, more particularly a vehicle frame structured to mitigate, absorb, or deflect the force of certain impacts ("impact mitigation") caused by objects approaching the vehicle frame from the rear without the use of additional subassemblies fixedly attached to the vehicle frame.

SUMMARY

Vehicles may have certain impact mitigation requirements and comprise frames consisting of various components structured to deform in a manner which mitigates the damage to the occupant compartment and systems of the vehicle (e.g., powertrain, steering, and vehicle occupant protection systems). A vehicle frame structured to perform impact mitigation without the use of additional subassemblies fixedly attached to the frame would be advantageous to allow the vehicle frame to be utilized without requiring significant modification while also saving on the number of components and weight of the vehicle. A rear portion of a vehicle frame with integrated impact mitigation features would prove useful towards achieving such a vehicle design.

Described herein is a rear portion of a vehicle frame comprised of forward segments of material structured to withstand certain impact force values without structurally deforming and rearward segments of material structured to mechanically deform when experiencing impacts exceeding the certain force values. The integral rear portion is advantageous in that there are no weak points or stress points created by the addition of mounting features to enable an impact mitigation feature or crash assembly to be fixedly attached to the rest of the frame. The integral rear portion also reduces weight and assembly complexity as compared to frames that have a fixedly attached impact mitigation feature or crash assembly instead of the integral rear portion.

The integral rear portion may comprise a plurality of welded formed panels which, when arranged in an assembled position, form a rounded quadrilateral. The integral rear portion may comprise a plurality of un-isolated mounting features to enable a vehicle body, at least one vehicle subframe, suspension components, and various components of a vehicle chassis (e.g., upper body) to be rigidly mounted to the integral rear portion. The impact force values and deformation criteria the integral rear portion is structured to comply with may be based on, at least in part, the requirements found in performance criteria for a particular product. The various features, portions, and components of the integral rear portion may include combinations of crash tubes, bend initiators, grooves, cut outs, and reinforcements enabling the integral rear portion to mechanically deform without contacting a battery module or other powertrain component accommodated by the structure of the overall vehicle frame.

In some embodiments, the rear portion of a vehicle frame may comprise the integral rear portion, which may comprise two rails comprised of a plurality of frame portions structured out of segments of materials of varying thicknesses, and one or more crossmembers. A rearmost crossmember may comprise at least one attachment or mounting feature for a tow apparatus that is structured to mechanically deform along a particular trajectory when impacted by a force such as a force defined by performance criteria employed for a product comprising the subject matter of the disclosure. The rear portion may further comprise a spare wheel mounting apparatus, positioned between the two rails, that is also structured to mechanically deform along a particular trajectory when impacted by a force such as a force defined by performance criteria employed for a product comprising the subject matter of the disclosure.

In some embodiments, a vehicle frame rail comprises a first rail portion comprising segments of a first thickness. Additionally, the vehicle frame rail comprises a second rail portion, attached to the first rail portion, comprising segments of a second thickness smaller than the first thickness. The vehicle frame rail further comprises a third rail portion, attached to the second rail portion, comprising segments of a third thickness smaller than the second thickness, wherein the third rail portion comprises a rear end of the vehicle frame rail. Each rail portion comprises at least two segments that partially overlap.

In some embodiments, segments of adjacent rail portions of the vehicle frame rail are welded to each other, which forms a seam between the adjacent rail portions. The welded segments between each adjacent rail portion, and thus the corresponding seam, comprise an offset. Additionally, the third rail portion comprises a height profile that decreases along a portion of its length toward the rear end.

In some embodiments, the third rail portion comprises a rigid body mount. The third rail portion comprises a rigid mount configured to be attached to a crossmember that comprises a tow mount for attaching to a towing apparatus. In some embodiments, the third rail portion comprises a frame rail reinforcement positioned adjacent to an inner surface of one or more segments. In some embodiments, the frame rail reinforcement comprises a plurality of deformation initiation features comprises at least one of a cutout or a crease. Additionally, the second rail portion comprises a plurality of suspension component mounts.

In some embodiments, the vehicle frame rail comprises a first rail portion comprising a first resistance to deformation. Attached to the first rail portion is a second rail portion comprising a second resistance to deformation smaller than the first resistance to deformation. Attached to the second rail portion is a third rail portion comprising a third resistance to deformation smaller than the second resistance to deformation. For example, each rail portion may initially experience a compression force in response to an impact from a rear approaching object. Additionally, individual surfaces of each rail portion may experience a tensile strain in response to the compression force and material reactions (e.g., elastic deformation) to the compression force.

In some embodiments, the disclosure is directed to a vehicle frame comprising a first rail member and a second rail member. Each of the first and second rail members comprise a front rail portion, wherein the front rail portion is configured to provide resistance to deformation to protect a battery pack assembly positioned between the first rail member and the second rail member. Each of the first and second rail members comprise a rail portion, wherein the rail portion is structured to mechanically deform when subjected to a threshold impact force.

In some embodiments, a rear tow mount apparatus is fixedly attached to at least a rear most crossmember of a plurality of crossmembers connected to each of the first and second rail members, and wherein the rear tow apparatus is positioned such that a rear approaching impacting object would contact the rear tow apparatus before any other feature of the vehicle frame.

In some embodiments, a spare wheel mount is fixedly attached to at least one of a plurality of crossmembers connected to each of the first and second rail members, and the spare wheel mount is further structured to mechanically deform such that when a rear most crossmember feature is impacted by a rear approaching object the spare wheel mount does not make contact with a crossmember positioned in front of the spare wheel mount.

In some embodiments, each of the first rail member and second rail member comprise a respective plurality of segments of varying thicknesses and wherein each of the respective plurality of segments comprise at least three different thicknesses, wherein a forwardmost segment of each of the respective plurality of segments comprises a thickest profile of the three different thicknesses. A rearmost segment of the respective plurality of segments comprises a thinnest material of the three different thicknesses. In some embodiments, at least one segment of each of the respective plurality of segments comprises a material different from the other segments of each of the respective plurality of segments.

In some embodiments, each of a rear respective plurality of segments, comprising each of the rail portions, comprises features to enable deformation when a tow mount to attach a tow apparatus is impacted by a rear approaching object. In some embodiments, the first rail member comprises at least one of an internal or an external reinforcement affixed to at least one segment comprising the first rail member, wherein the at least one internal or external reinforcement increases resistance to deformation of the first rail member by increasing a thickness of the first rail member. In some embodiments, the second rail member comprises at least one of an internal or an external reinforcement affixed to at least one segment comprising the second rail member, wherein the at least one internal or external reinforcement increases resistance to deformation of the second rail member by increasing a thickness of the second rail member.

In some embodiments, each of a plurality of components of the vehicle frame comprises features to enable deformation when a mount to attach a tow apparatus is impacted by a rear approaching object except for a respective front plurality of segments comprising each front rail portion.

In some embodiments, at least a pair of a respective plurality of segments comprising at least a sub-portion of either the front rail portion or the rail portion is fixedly attached to each other by welding (e.g., by laser welding or other suitable welding techniques suitable for affixing the material comprising the segments together). Each of the first rail member and the second rail member comprise at least one rigid body mount and/or at least one rigid suspension mount.

In some embodiments, a rearmost rigid body mount comprises a structure configured such that a vehicle body translates or deforms independent of the crossmembers and rail members when a rear crossmember, fixedly attached to each of the first rail member and the second rail member is impacted by a rear approaching object.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Methods and systems are provided herein for a vehicle frame with integrated impact mitigation features structured to achieve a performance criteria associated with impacts caused by objects approaching the vehicle frame from the rear without requiring additional subassemblies to be fixedly attached to the vehicle frame.

Figure 1:
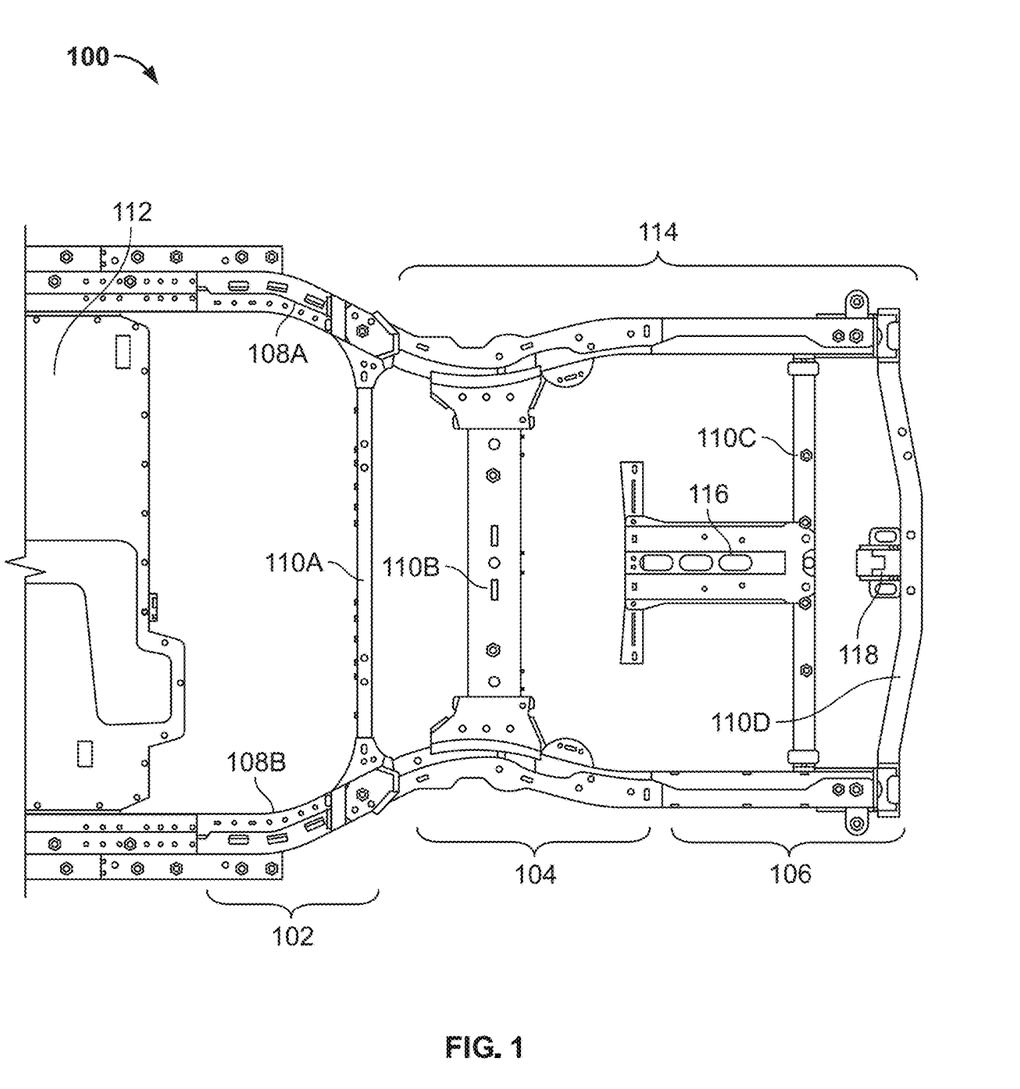
FIG. 1 depicts a frame comprising portions of varying thicknesses, in accordance with some embodiments of the disclosure.

FIG. 1 is a top view of frame 100 comprised of rail portions 102, 104, and 106, in accordance with some embodiments of the disclosure. Frame 100 may comprise more or fewer than the elements depicted in or described in reference to FIG. 1. Additionally, frame 100 may incorporate or may be incorporated into any or all of FIGS. 2-8.

Frame 100 comprises a perimeter defined by frame rails 108A and 108B. Frame rails 108A and 108B are connected by crossmembers 110A-110D. Each of frame rails 108A and 108B is comprised of rail portions 102, 104, and 106, respectively. Rail portions 104 and 106, taken together, comprise deformable frame rail portion 114. Panels or segments that form each of rail portions 102, 104, and 106 may be of varying thicknesses, lengths, and geometries. For example, frame rails 108A and 108B may comprise rail portions of at least three thicknesses. Rail portion 102 corresponds to a frame portion of the largest material thickness and may also be considered a rigid frame portion as it is structured to withstand impact forces from a rear approaching object (e.g., resulting initially in compressive force on the rigid frame portion which may result in surfaces of the rigid frame portion experiencing tension depending on the reaction of the material comprising the rigid frame portion to the compressive force resulting from the rear approaching object impact) without mechanically deforming or at least minimally mechanically deforming to prevent contacting the shown battery pack (e.g., may be comprised of exterior rail segments that are at least 3.0 millimeters thick). Battery pack 112 may be larger or a different geometry than the battery pack shown and is arranged between frame rails 108A and 108B. For example, a higher capacity battery pack may extend further to the right in the view of FIG. 1 and be positioned relatively close to the frame portion of the largest material thickness (e.g., within 10-50 mm of portion 102). Frame 100 is structured such that crossmember 110A does not deform, in response to a rear approaching impact heading towards crossmember 110D, in a manner that enables crossmember 110A to contact battery pack 112.

In some embodiments, deformable frame rail portions 114 are comprised of rail portions 104 corresponding to a second largest material thickness and rail portions 106 of a lowest material thickness of all rail portions 102, 104 and 106 (e.g., rail portions 104 may be comprised of panels of at least a 2.0 millimeter thickness, but less than a 3.0 millimeter thickness, and rail portions 106 are comprised of panels or segments of at least a 1.8 millimeter thickness, but less than a 2.0 millimeter thickness, or, alternatively, rail portions 106 are at most 1.8 millimeters thick). Spare wheel mount 116 is fixedly attached to crossmember 110C. The mounts and features of spare wheel mount 116 are arranged and structured such that as spare wheel mount 116 deforms when subjected to a threshold impact force (e.g., equivalent to a force corresponding to a force defined by performance criteria, spare wheel mount 116 does not contact crossmember 110B, positioned forward of spare wheel mount 116. Crossmember 110D is depicted as the rearmost crossmember and comprises tow mount apparatus 118 that is positioned and structured to create a first point of impact when a rear approaching impacting object creates contact with frame 100. Tow mount apparatus 118 may be structured to deform in a manner to prevent a rear approaching impacting object from contacting a rear wheel actuating apparatus (e.g., a drivetrain or powertrain with a central rotational axis arranged, and not depicted in FIG. 1, between crossmembers 110B and 110D) positioned forward of spare wheel mount 116 and accommodated by frame 100.

Figure 4A:
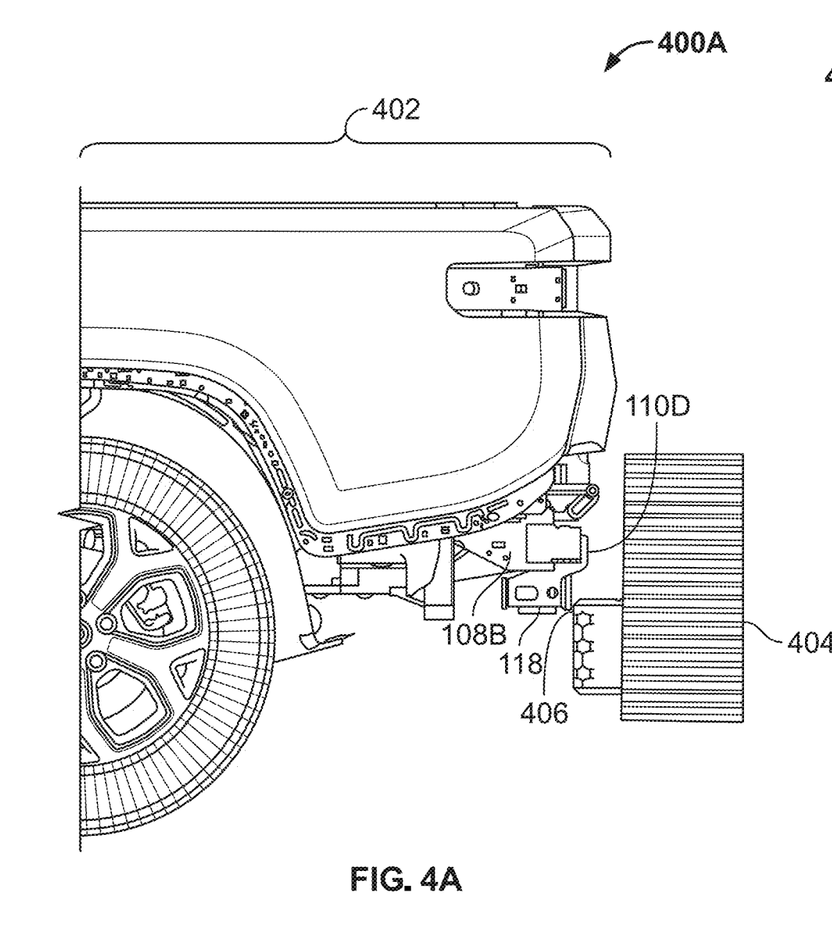
FIGS. 4A and 4B depict a side view and a top view, respectively, of an exemplary crash scenario, in accordance with some embodiments of the disclosure.
Figure 4B:
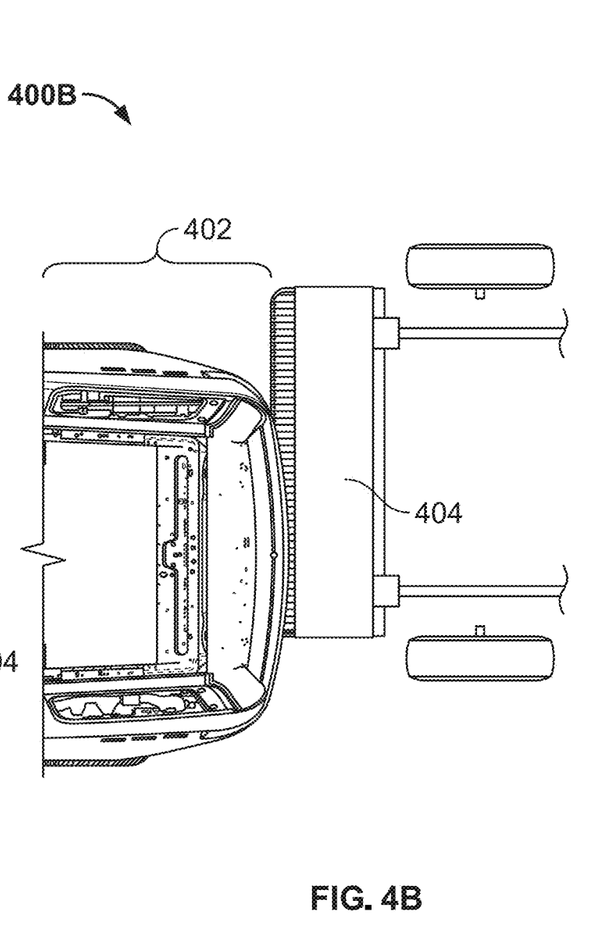

Rail portions 102, 104, and 106 each comprise at least one material surface. In some embodiments, each of rail portions 102, 104, and 106 comprise geometry corresponding to a quadrilateral cross section, resulting in four different material surfaces. In some embodiments, each of the material surfaces of each of rail portions 102, 104, and 106 comprise a same material. In some embodiments, at least two different materials comprise the material surfaces of each of rail portions 102, 104, and 106. Rail portion 102 comprises a highest yield strength and a highest ultimate strength of rail portions 102, 104, and 106. Rail portion 106 comprises a lowest yield strength and a lowest ultimate strength of rail portions 102, 104, and 106. Rail portion 104 comprises a yield strength and an ultimate strength higher than rail portion 106 and lower than rail portion 102. Rail portion 106 is configured to mechanically deform prior to rail portions 104 and 106 in response to an impact from a rear approaching object (e.g., as depicted in FIGS. 4A and 4B). Rail portion 106 mechanically deforms in response to a compressive force generated by the impact of the rear approaching object with at least one element or feature of crossmember 110D (e.g., tow mount apparatus 118). In some embodiments, rail portion 106 mechanically deforms or yields in response to a compressive load generated throughout rail portion 106 from the impact of the rear approaching object. Once the compressive deformation of rail portion 106 is initiated, individual surfaces of rail portion 106 may experience tensile loads based on the mechanical deformation of rail portion 106.

Rail portion 104 comprises a material thickness such that rail portion 104 has a resistance to deformation higher than rail portion 106 and therefore is configured to mechanically deform at a load that exceeds a deformation load of rail portion 106. For example, if the impact load received at rail portion 106 exceeds the yield strength of rail portion 104 (e.g., is large enough to exceed at least one of a yield or ultimate strength of rail portion 106 and still exceed the yield strength of rail portion 104 after rail portion 106 mechanically deforms), then rail portion 104 is subjected to strain or mechanical deformation corresponding to the transferred or undissipated impact load.

In some embodiments, when an object impacts rail portion 106, or a component affixed to rail portion 106 (e.g., tow mount apparatus 118 which may be connected to rail portion 106 via crossmember 110D), a reactive force at a connective interface between rail portion 104 and rail portion 106 may result in a load being transferred to rail portion 104 that exceeds at least the yield strength of rail portion 104 resulting in a cumulative build up and transfer of compressive forces throughout the frame rail comprised of rail portions 104 and 106. Rail portion 106 is structured to mechanically deform prior to rail portion 104 initiating any mechanical deformation (e.g., a yield strength of rail portion 104 is substantially similar to, equal to, or exceeds an ultimate strength of rail portion 106). As a result, if the impact load exceeds the ultimate strength of rail portion 106 after rail portion 106 has substantially failed (e.g., mechanically deformed to a point of breaking or fracturing) and at least meets or exceeds the yield strength of rail portion 104, then rail portion 104 is configured to mechanically compress based on the load (e.g., the material comprising rail portion 104 will yield to the transferred load and will progressively deform until the compressive load dissipates or is prevented from continuing to compile). In some embodiments, rail portion 102 is confirmed to be resistant to any deformation in response to an impact from a rear approaching object based on parameters defined by defined by performance criteria. In some embodiments, the ultimate strength of rail portion 106 is substantially similar to, equal to, or less than the yield strength of rail portion 104. In some embodiments, the ultimate strength of rail portion 104 is substantially similar to, equal to, or less than the ultimate strength of rail portion 102.

Figure 2:
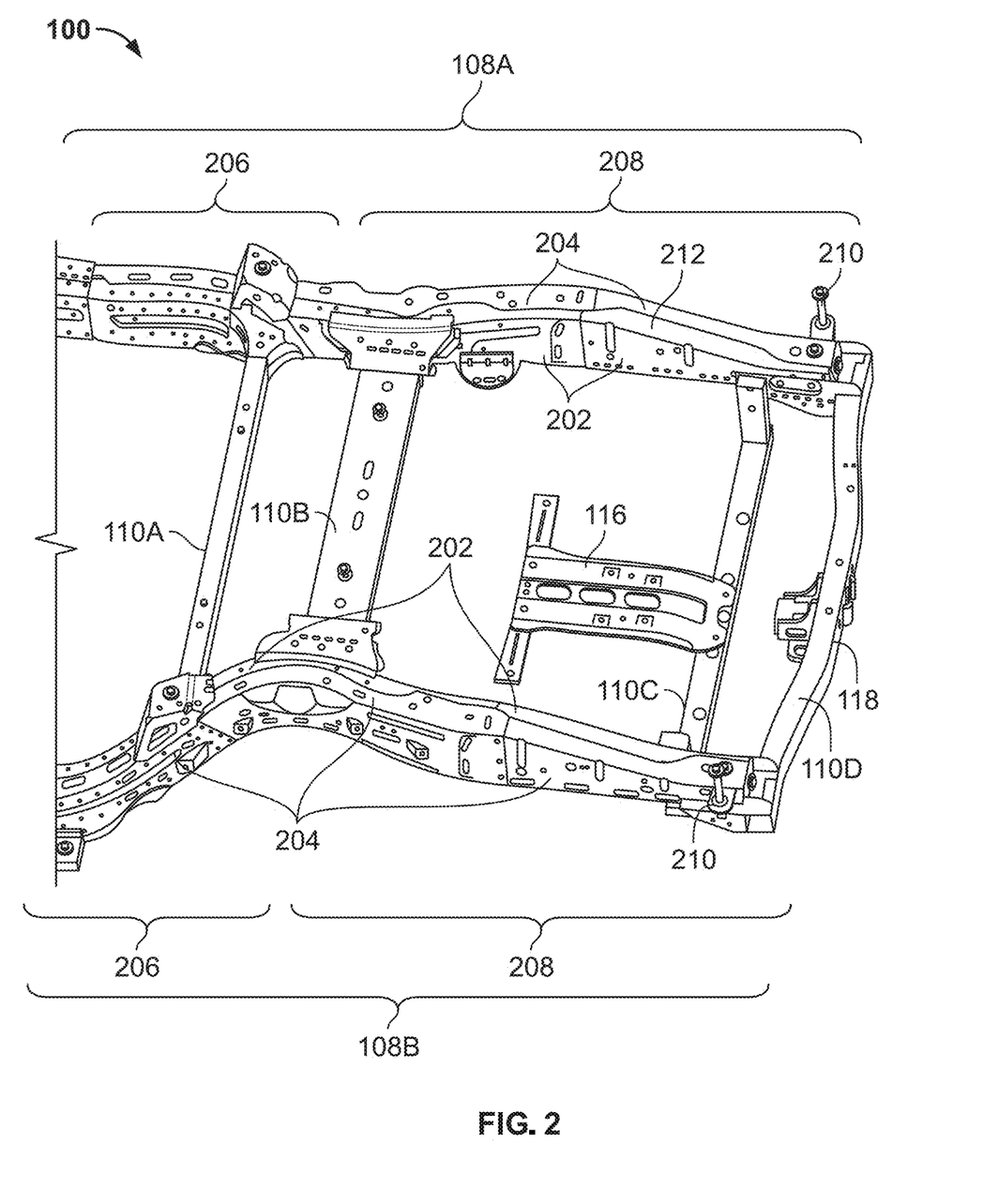
FIG. 2 depicts a frame comprising a pair of rails, in accordance with some embodiments of the disclosure.

FIG. 2 is an isometric view of frame 100. Frame 100 may comprise more or fewer than the elements depicted in or described in reference to FIG. 2. Additionally, frame 100 may incorporate or may be incorporated into any or all of FIGS. 1 and 3-8.

Frame 100 comprises frame rails 108A and 108B connected by crossmembers 110A-110D. Frame rails 108A and 108B are structured from inner segments 202 welded (e.g., via welds 212 which may comprise laser welds or welds created or formed by any suitable apparatus or technique considering the selected material for forming the frame rails) to outer segments 204 in an overlapping and offset manner as illustrated in FIG. 2. The arrangement of inner segments 202, outer segments 204, and the features thereof (e.g., bends, thickness, cut-outs, protrusions) enable the structure of frame rails 108A and 108B to deform in compliance with designed crash criteria (e.g., as characterized by the performance criteria defined in a performance specification or the like). Rigid rail portion 206 corresponds to rail portion 102 of FIG. 1 and is structured to retain an initial shape despite experiencing an impact. Deformable rail portion 208 corresponds to deformable rail portion 114 of FIG. 1 and is structured to deform and absorb, or deform and deflect, impact energy away from rigid portion 206. Spare wheel mount 116 is affixed crossmember 110C. Tow mount apparatus 118 is affixed to or comprises crossmember 110D.

Rigid body mounts 210 are arranged along ends of rails 108A and 108B, outboard of where crossmember 110D is fixedly attached to each of frame rails 108A and 108B. Rigid body mounts 210 may be structured to mechanically deform when tow mount apparatus 118 is impacted by a rear approaching object such that a body, fixedly attached to each of rigid body mounts 210, deforms or translates separate from frame 100.

Figure 3A:
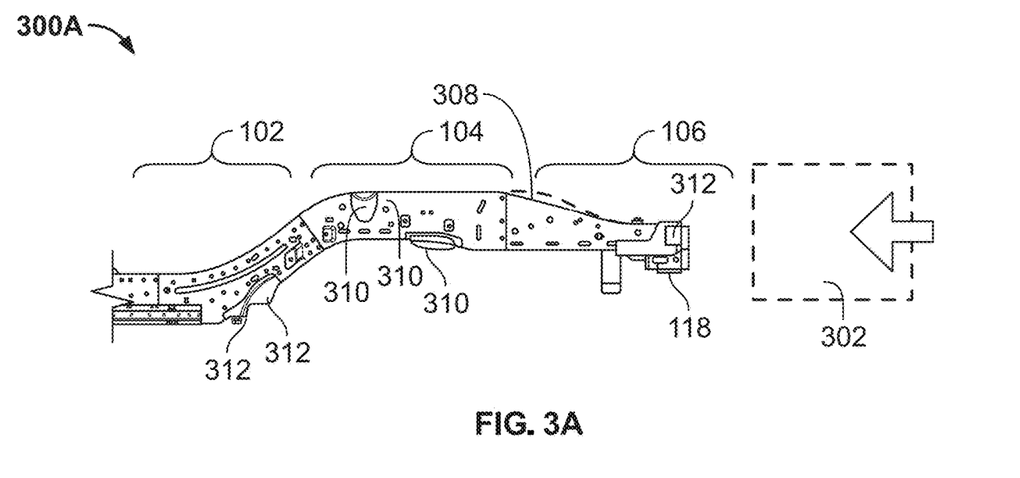
FIGS. 3A and 3B depict side views of frame rails, in accordance with some embodiments of the disclosure.
Figure 3B:
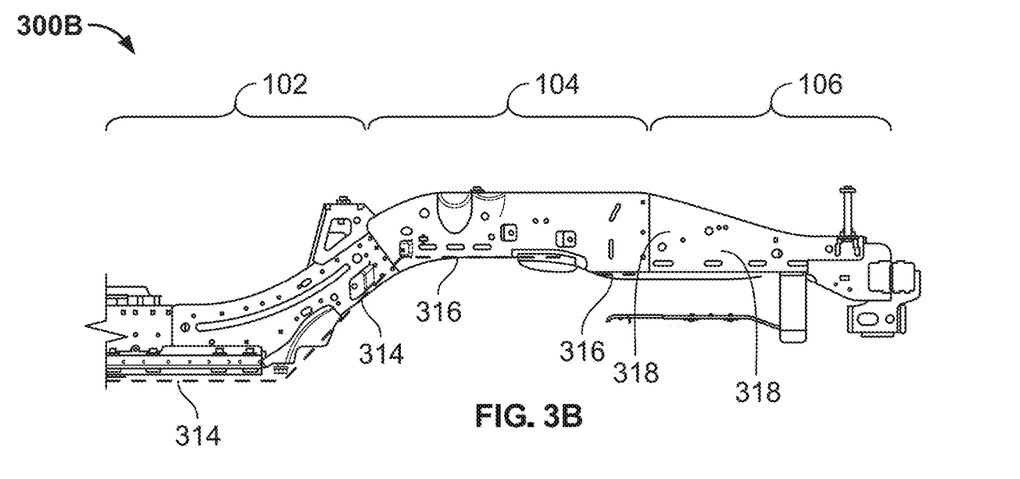

FIGS. 3A and 3B shows side views of frame rails 300A and 300B. Either or both of frame rails 300A and 300B may comprise more or fewer than the elements depicted in or described in reference to FIGS. 3A and 3B. Additionally, either or both of frame rails 300A and 300B may incorporate or may be incorporated into any or all of FIGS. 1, 2, and 4-8.

Frame rail 300A comprises rail portion 102, first deformable rail portion 104, and second deformable rail portion 106, each of which comprises interior segments (not shown) and outer segments (corresponding to outer segments 204 in FIG. 2). Rail portion 102 has a largest thickness (e.g., 3.0 millimeters) of rail portions 102, 104, and 106. Additionally, rail portion 102 is structured to retain a same shape and position when frame rail 300A is impacted by rear approaching object 302 (e.g., to prevent a frame comprising frame rail 300A from deforming enough to contact a battery pack positioned forward of rail portion 102 in a vehicle assembly). First deformable rail portion 104 has a second largest thickness (e.g., 2.0 millimeters) and corresponds to rail portion 104 of FIG. 1. Second deformable rail portion 106 has a smaller profile or thickness (e.g., 1.8 millimeters) and corresponds to portion 106 of FIG. 1. Second deformable rail portion 106 comprises height profile 308 that decreases along at least a portion of the length of second deformable rail portion 106 from a front of second deformable rail portion 106, adjacent to an end of first deformable rail portion 104, toward a rear of second deformable rail portion 106.

In some embodiments, height profile 308 is structured such that the resistance to deformation of second deformable portion 106 increases from the rear to the front of second deformable portion 106 such that the rear of second deformable portion is least resistant to deformation. In some embodiment, each of rail portion 102, first deformable rail portion 104, and second deformable rail portion 106 comprises panels or segment arranged such that when they are welded together and/or otherwise fixedly coupled to each other, a rail formed by these rail portion comprises a height and/or thickness profile where resistance to deformation decreases towards the rear of the assembly (e.g., as a position along the profile approaches to tow mount apparatus 118 or is substantially aligned with tow mount apparatus 118, the lower the resistance of the rail corresponding to that position is to deformation). First deformable rail portion 104 and second deformable rail portion 106 are structured to deform along a trajectory which minimizes or prevents translation or deformation of rail portion 102 when impacted by rear approaching object 302. Frame rail 300A also comprises suspension component mounts 310 (e.g., damper and spring mounts) as well as body-to-frame mounts 312. Each of the mounts may be rigid and without isolation or may incorporate some aspects of isolation so long as the stiffness (e.g., as defined by at least one of the Young's Modulus of the mount, the yield strength of the mount, or the ultimate strength of the mount) and planned deformation of the overall rear frame satisfies criteria (e.g., as interpreted from performance criteria).

Frame rail 300B, corresponding to a side view of frame rail 108B of FIG. 1, comprises rail portion 102, first deformable portion 104, and second deformable portion 106. Affixed to portion 102 are deformation resistant reinforcements 314 arranged along the underside of portion 102. Deformation resistant reinforcements 314 may be welded to portion 102 or otherwise fixedly attached to maintain a flush connection between a surface of deformation resistant reinforcements 314 and portion 102 such that deformation resistant reinforcements 314 provide structural support to portion 102, thereby increasing the mechanical deformation threshold of portion 102. Deformation resistant reinforcements 314 may increase the total thickness of material arranged in portion 102 to 5.0 millimeters or more. First deformable portion 104 comprises deformation reducing reinforcements 316, which results in a material thickness which may exceed 3.0 millimeters and does not exceed or reach 5.0 millimeters. Second deformable portion 106 comprises no reinforcements. Each of the portions with reinforcements or reinforcement panels applied may be welded or mechanically fixedly attached in a manner that creates asymmetric attachment points (e.g., the overlapping and offset joints shown in FIGS. 2 and 3) such that any thin or weak components in the frame rail are not directly along a same axis and/or on a same plane. Additionally, frame rail 300B comprises deformation initiation features 318. Deformation initiation features 318 may comprise features such as mounting points, cut-outs, bends, and/or protrusions that enable a frame comprising frame rail 300B to meet crash criteria, as described in this disclosure (e.g., to ensure second deformable portion 106 mechanically deforms in response to rear approaching impact forces before first deformable portion 104 mechanically deforms and first deformable portion 104 deforms in response to the rear approaching impact forces before portion 102 is subjected to forces that result in mechanical deformation of portion 102.

FIG. 4A shows side view 400A and FIG. 4B shows top view 400B of vehicle rear portion 402 experiencing an impact from rear approaching object 404 about tow mount apparatus 118 affixed to crossmember 110D connecting frame rail 108B to a second frame rail (e.g., frame rail 108A of FIG. 1), in accordance with some embodiments of the disclosure. Vehicle rear portion 402 may comprise more or fewer than the elements depicted in or described in reference to FIGS. 4A and 4B. Additionally, vehicle rear portion 402 may incorporate or may be incorporated into any or all of FIGS. 1-3 and 5-8.

As shown via side view 400A of FIG. 4A and top view 400B of FIG. 4B, vehicle rear portion 402 is subjected to an off-center impact based on the approach trajectory of rear approaching object 404. Tow mount apparatus 118 is arranged such that rear approaching object 404 creates single contact point 406 with tow mount apparatus 118 such that frame rail 108B may direct and/or divert forces from the impact along predetermined deformation paths (e.g., as enabled by deformation initiation features 318 of FIG. 3 as well as the varying thicknesses of portions of frame rail 108B, as described herein).

Figure 5A:
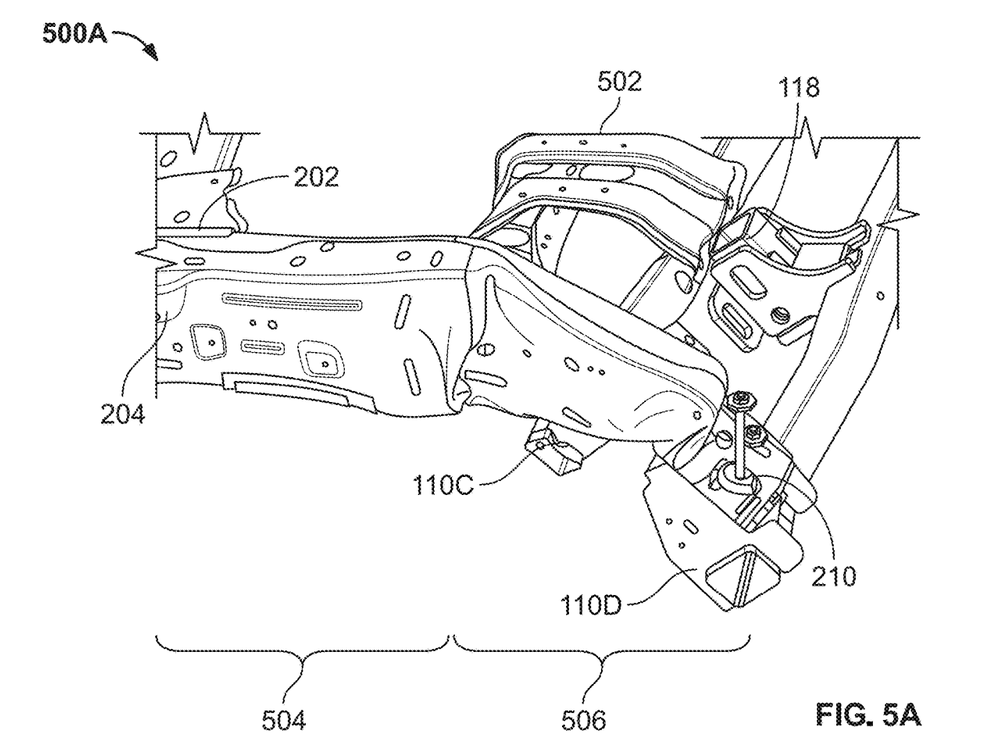
FIGS. 5A and 5B depict a pair of views of a deformed spare wheel mount of the frame, in accordance with some embodiments of the disclosure.
Figure 5B:
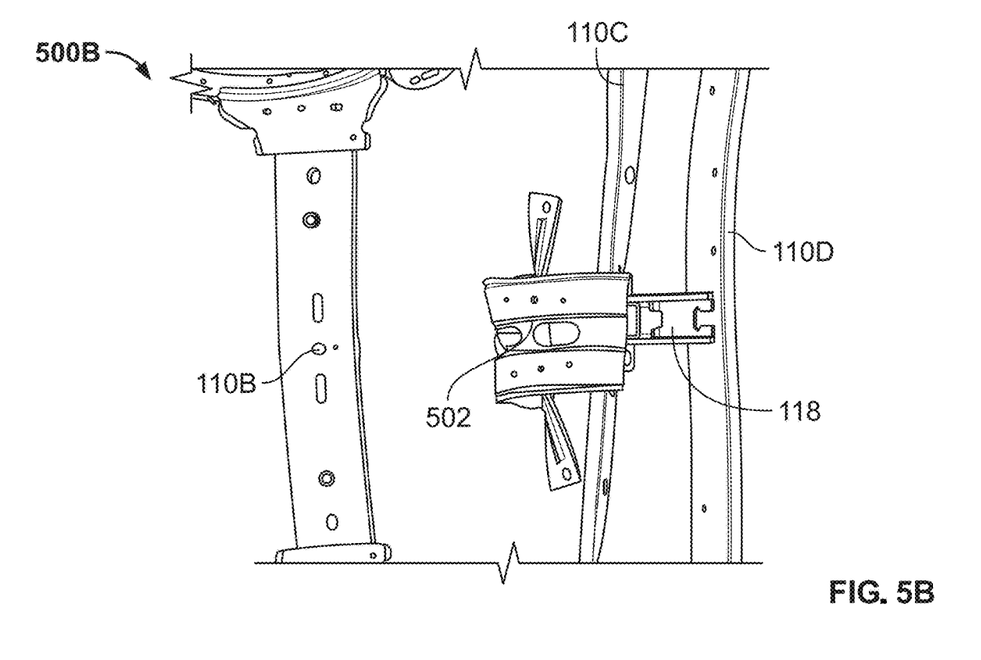

FIG. 5A depicts angled view 500A and FIG. 5B depicts top view 500B of deformed frame 500, where deformed frame 500 has mechanically deformed in response to being impacted by a rear approaching object (e.g., rear approaching object 404 of FIG. 4) about tow mount apparatus 118. Deformed frame 500 may comprise more or fewer than the elements depicted in or described in reference to FIGS. 5A and 5B. Additionally, deformed frame 500 may incorporate or may be incorporated into any or all of FIGS. 1-4 and 6-8.

Deformed frame 500 comprises deformed first portion 504 and deformed second portion 506, which have deformed because of an impact by a rear approaching object (e.g., rear approaching object 404 of FIG. 4). Deformed first portion 504 and deformed second portion 506 together correspond to deformable frame rail portions 114 of FIG. 1, where deformed second portion 506 comprises panels and other deformation initiation features (e.g., deformation initiation features 318 of FIG. 3) such that deformed second portion 506 experiences mechanical deformation prior to deformed first portion 504 experiencing mechanical deformation. As shown in FIG. 5, deformed section portion 506 exhibits more mechanical deformation than deformed first portion 504.

Rigid body mount 210 is positioned towards the rear of deformed second portion 506. Rigid body mount 210 is structured to deform relatively independent of a body fixedly attached by rigid body mount 210 to deformed frame 500. For example, as frame 500 mechanically deforms in response to a rear approaching impact (e.g., crumples), rigid body mount 210 moves towards crossmember 110C and downward away from the body fixedly attached at rigid body mount 210. This separation may result in a bend to the body; however, the body is free to translate away from deformed frame 500 and may not crumple in the same manner as deformed frame 500. Deformed spare wheel mount 502 is shown affixed to crossmember 110C. Crossmember 110C connects a pair of frame rails (e.g., frame rails 108A and 108B of FIG. 1). Deformed spare wheel mount 502 comprises varying mount, reinforcement and deformation initiation features to enable a wheel to be secured to deformed spare wheel mount 502 prior to the rear approaching impact. These varying mount, reinforcement, and deformation initiation features are structured to limit variation in the deformation of deformed spare wheel mount 502 such that features and subcomponents of deformed frame 500 arranged to the left of outer segment 204 and inner segment 202 are not affected or deformed by the rear approaching impact.

Top view 500B of deformed frame 500 depicts deformed spare wheel mount 502 affixed to crossmember 110C. Crossmembers 110B, 110C, and 110D connect a pair of frame rails (e.g., frame rails 108A and 108B of FIG. 1). As shown, deformed spare wheel mount 502 is structured to deform when the frame rails are subjected to an impact from a rear approaching object without contacting crossmember 110B.

Figure 6:
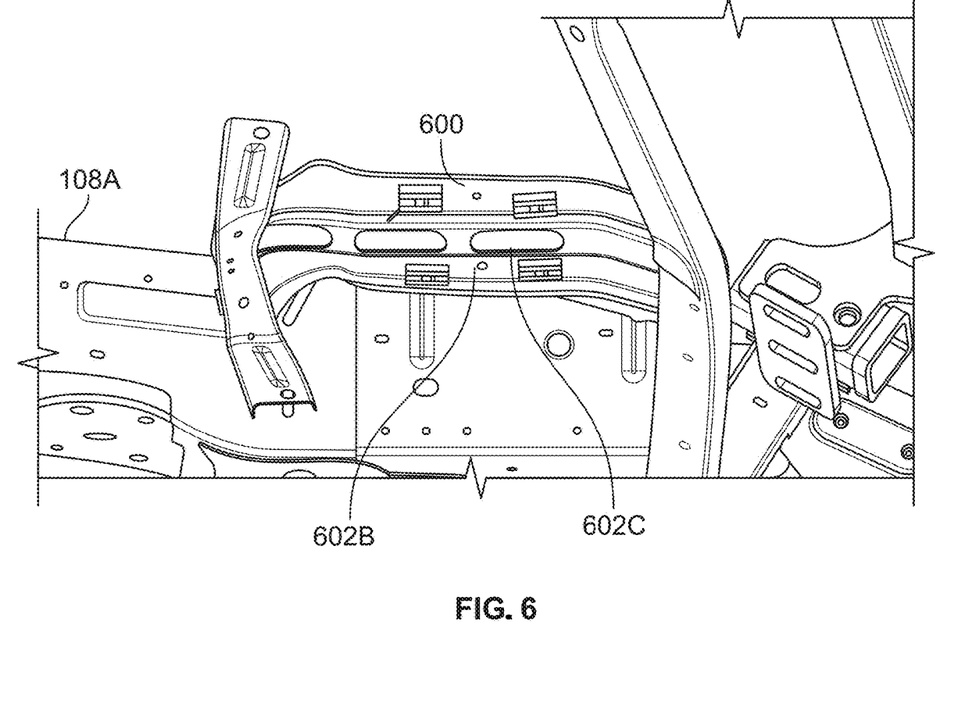
FIG. 6 depicts deformation initiation features of the spare wheel mount of the frame, in accordance with some embodiments of the disclosure.

FIG. 6 depicts partially deformed spare wheel mount 600 comprising deformation initiation features 602A-C (e.g., cutouts and creases) structured to enable partially deformed spare wheel mount 600 to mechanically deform without contacting a crossmember positioned forward of partially deformed spare wheel mount 600 (e.g., as shown in FIG. 5). Partially deformed spare wheel mount 600 may comprise more or fewer than the elements depicted in or described in reference to FIG. 6. Additionally, partially deformed spare wheel mount 600 may incorporate or may be incorporated into any or all of FIGS. 1-5, 7, and 8.

Deformation initiation feature 602A comprises a crease along an edge of partially deformed spare wheel mount 600. A crease decreases the stiffness (e.g., as defined by at least one of the Young's Modulus of the material, the yield strength of the material, or the ultimate strength of the material that comprises spare wheel mount 600) in the material formed to have the crease as during formation of the crease there is intentional damage to the material structure forming the material. A strategically aligned crease (e.g., along an edge of a component configured to deform) enables intentional and strategic deformation profiles, as shown in FIG. 6. Deformation initiation feature 602B comprises a circular cutout in the material is also used to reduce stiffness (e.g., as defined by at least one of the Young's Modulus of the material, the yield strength of the material, or the ultimate strength of the material that comprises spare wheel mount 600) without impacting vibrational modes of the material in which the circular cutout is formed. The circular cutout concentrates material stress about deformation initiation feature 602B, thereby initiating deformation proximate to deformation initiation feature 602B without impacting vibrational response of the material. Deformation initiation feature 602C comprises an oval cutout in the material forming partially deformed spare wheel mount 600. An oval or elliptical cutout decreases the surface area of a region subjected to mechanical material stress (e.g., buckling stress or torsional stress as experienced by material subjected to an impact when affixed at various mounting points like partially deformed pare wheel mount 600). The oval or elliptical cutout enables an increased resistance to buckling forces along the elongated sides of the cutout, thereby directing a buckling force to other portions of material with the oval or elliptical cutout. As shown in FIG. 6, deformation initiation feature 602C, comprising the oval or elliptical shape, remains in an original shape along the elongated sides of deformation initiation feature 602C and other portions of partially deformed spare wheel mount 600 are depicted with increase deformation with respect to the material comprising and surrounding deformation initiation feature 602C.

Figure 7A:
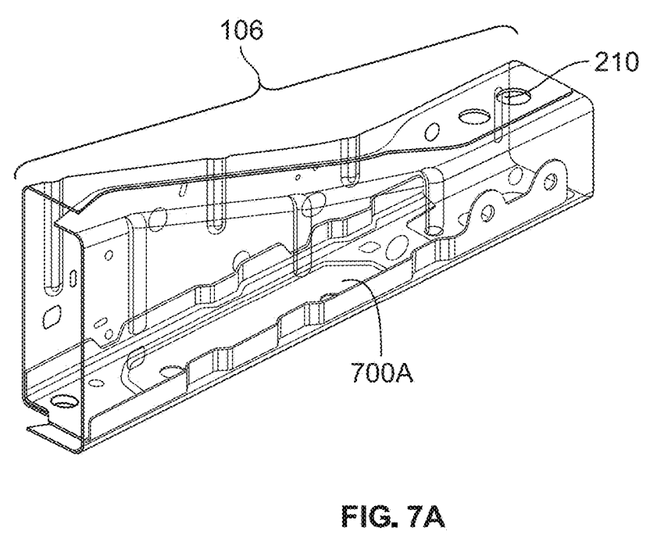
FIGS. 7A and 7B depict frame rail reinforcements, in accordance with some embodiments of the disclosure.
Figure 7B:
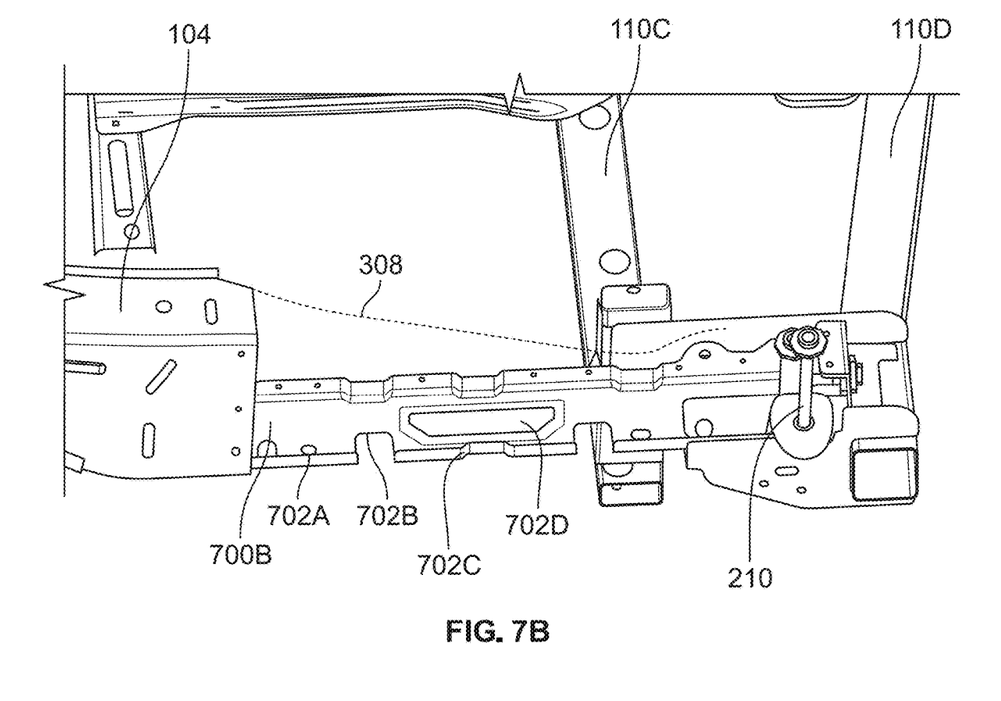

FIGS. 7A and 7B show a pair of views of second deformable portion 106, comprising frame rail reinforcements 700A and 700B, that is arranged to be fixedly attached to a bottom surface of second deformable portion 106. Frame rail reinforcements 700A and 700B may comprise more or fewer than the elements depicted in or described in reference to FIGS. 7A and 7B. Additionally, frame rail reinforcements 700A and 700B may incorporate or may be incorporated into any or all of FIGS. 1-6, and 8.

Frame rail reinforcements 700A and 700B are arranged in an installation position along a bottom of second deformable portion 106 and proximate to rigid body mount 210, which is positioned towards the rear of crossmember 110D of FIG. 1. Also shown is an end of first deformable portion 104 and crossmember 110C. As discussed in reference to FIGS. 1-3, first deformable portion 104 is structured to mechanically deform in response to rear approaching impacts and comprises panels or segments that are thicker than second deformable portion 106 and frame rail reinforcements 700A and 700B such that second deformable portion 106 and frame rail reinforcements 700A and 700B mechanically deform prior to first deformable portion 104 experiencing mechanical deformation. For reference, height profile 308 of FIG. 3 illustrates the curvature of a top surface of second deformable portion 106 if it were depicted in FIG. 7.

Reinforcement 700B is shown as comprising deformation initiation features 702A-D (e.g., cutouts and creases in a main body of frame rail reinforcements 700A and 700B such that although reinforcement 700B increases the resilience of second deformable portion 106, second deformable portion 106 remains configured to mechanically deform prior to first deformable portion 104). Deformation initiation feature 702A comprises a circular cutout with properties akin to those of deformation initiation feature 602B of FIG. 6. Deformation initiation feature 702B comprises a semi-circular cutout along an edge of reinforcement 700B, which is configured to reduce stiffness (e.g., as defined by at least one of the Young's Modulus of the material, the yield strength of the material, or the ultimate strength of the material that comprises reinforcement 700B) along the edge of reinforcement 700B such that reinforcement 700B is configured to deform rotationally and proximate to deformation initiation feature 702B. Deformation initiation feature 702C comprises a semi-circular crease along the edge of reinforcement 700B such that reinforcement 700B has a reduced resistance (e.g., as defined by at least one of the Young's Modulus of the material, the yield strength of the material, or the ultimate strength of the material that comprises reinforcement 700B) to compression forces (e.g., as caused by a rear approaching impacting object) such that reinforcement 700B deforms along a crease comprising deformation initiation feature 702C before deformable portion 104 is subjected to mechanical deformation. Deformation initiation feature 702D comprises an oval or elliptical shape and corresponds to deformation initiation feature 602C of FIG. 6.

Figure 8:
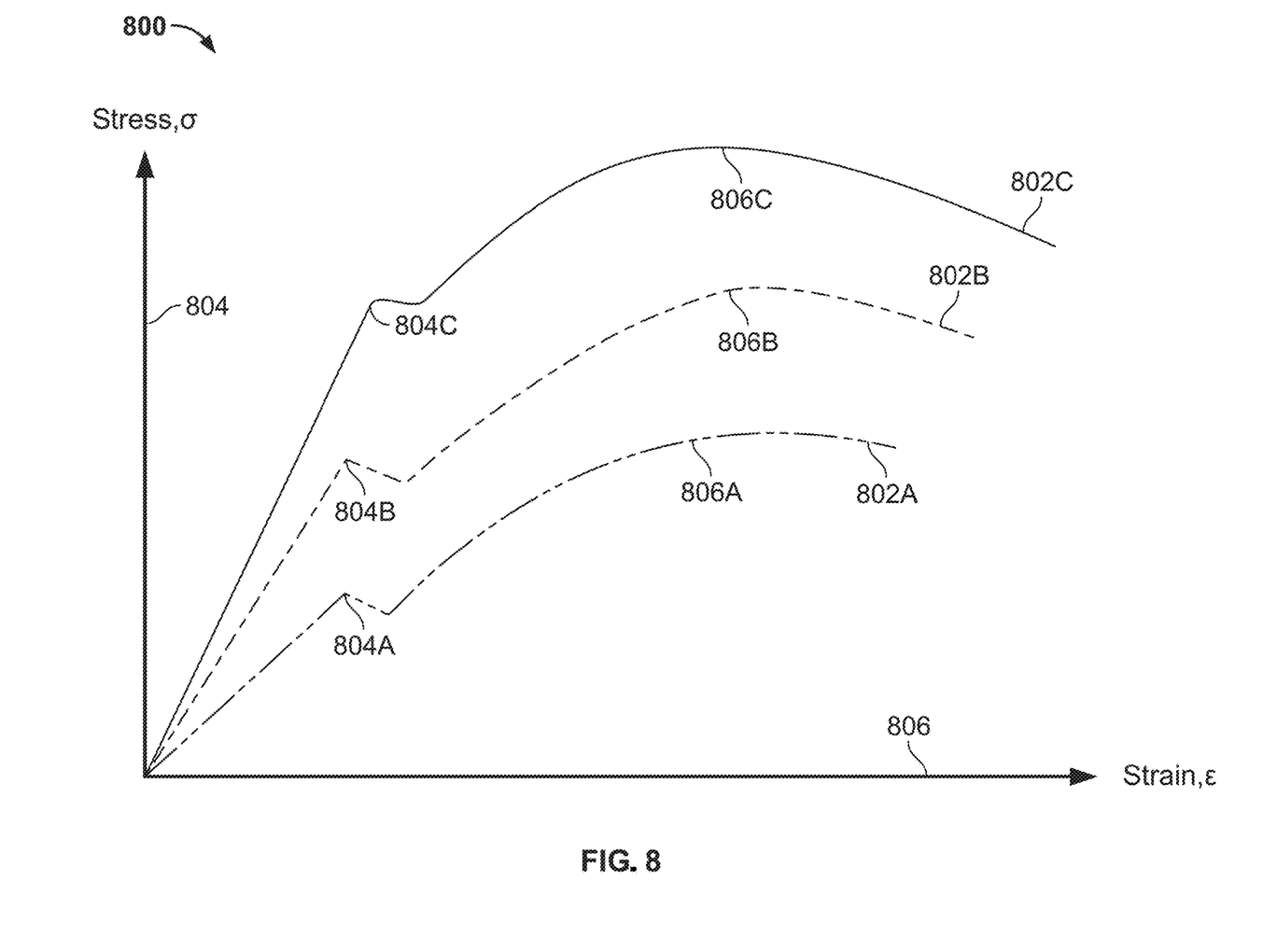
FIG. 8 depicts three illustrative stress-strain curves of different portions of an exemplary frame rail, in accordance with some embodiments of the disclosure.

FIG. 8 depicts chart 800 populated with stress-strain curves 802A, 802B, and 802C, each corresponding to different portions of an exemplary frame rail, in accordance with some embodiments of the disclosure. Each of stress-strain curves 802A, 802B, and 802C correspond to frame rails that may comprise more or fewer than the elements depicted in or described in reference to FIGS. 1-8.

Chart 800 comprises vertical stress axis 804 and horizontal strain axis 806. Vertical stress axis 804 corresponds to internal forces experienced by contacting portions of material comprising a frame rail. Horizontal strain axis 806 corresponds to an amount of deformation experienced by material in response to the internal forces of vertical stress axis 804. Vertical stress axis 804 may be scaled based on the forced generated by an impact of a rear approaching object with a rear portion of a vehicle frame (e.g., as defined by or interpreted in reference to performance criteria). Each of stress-strain curves 802A-C characterize a resistance to deformation of each of rail portions 106, 104, and 102, respectively. For example, the yield and ultimate strengths of each curve correspond to values which, if exceeded, would result in at least one of elastic or plastic mechanical deformation of each of rail portions 106, 104, and 102. In some embodiments, the resistance to deformation may be characterized by a slope of the depicted stress-strain curves from the start of the curve at the intersection of the depicted axes up to the depicted yield strengths, corresponding to the Young's modulus for each respective rail portion. In some embodiments, the resistance to deformation (e.g., at least one of the yield strength, the ultimate strength, and the Young's modulus) may vary along the length of each respective rail portion. The resistance to deformation for each respective rail portion may correspond to a minimum value of at least one of the yield strength, the ultimate strength, and the Young's modulus for each respective rail portion.

Stress-strain curve 802A corresponds to a response of rail portion 106 of FIG. 1 to a force corresponding to an impact from a rear approaching object (e.g., as depicted in FIGS. 4A and 4B). Stress-strain curve 802A comprises yield strength 804A and ultimate strength 806A of rail portion 106. Ultimate strength 806A is substantially similar to, equal to, or less than yield strength 804B of stress-strain curve 802B. Stress-strain curve 802B corresponds to a response of rail portion 104 of FIG. 1 to a force corresponding to an impact from a rear approaching object (e.g., as depicted in FIGS. 4A and 4B). Stress-strain curve 802B comprises yield strength 804B and ultimate strength 806B of rail portion 104. Ultimate strength 806B is substantially similar to, equal to, or less than yield strength 804C of stress-strain curve 802C. Stress-strain curve 802C corresponds to a response of rail portion 102 of FIG. 1 to a force corresponding to an impact from a rear approaching object (e.g., as depicted in FIGS. 4A and 4B). Stress-strain curve 802C comprises yield strength 804C and ultimate strength 806C of rail portion 102. Ultimate strength 806C is substantially similar to or greater than an ultimate force corresponding to an impact from a rear approaching object as defined by or interpreted from performance criteria. Each of the strengths depicted correspond to a resistance to compressive or tensile deformation of each of rail portions 102, 104, and 106. In some embodiments, these curves may be adjusted depending on the integration of deformation initiation features (e.g., as shown in and described in reference to FIGS. 7A and 7B) in each of rail portions 102, 104, and 106.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to examples, any such reference is merely to provide context to the instant disclosure and does not form any admission as to what constitutes the state of the art.

What is claimed is:

1. A vehicle frame rail comprising:
a first rail portion comprising segments of a first thickness;
a second rail portion, attached to the first rail portion, comprising segments of a second thickness smaller than the first thickness; and
a third rail portion, attached to the second rail portion, comprising segments of a third thickness smaller than the second thickness, wherein:
the third rail portion comprises a rear end of the vehicle frame rail and a frame rail reinforcement positioned adjacent to an inner surface of one or more segments of the third rail portion, and
the frame rail reinforcement comprises a plurality of deformation initiation features comprising at least one of a cutout or a crease.

2. The vehicle frame rail of claim 1, wherein each of the first, the second and the third rail portion comprises at least two segments that partially overlap.

3. The vehicle frame rail of claim 2, wherein two segments of adjacent rail portions of the vehicle frame rail that partially overlap are welded to each other, which forms a seam between the adjacent rail portions.

4. The vehicle frame rail of claim 3, wherein the two segments welded to each other between each adjacent rail portion, and thus the corresponding seam, comprise an offset.

5. The vehicle frame rail of claim 1, wherein the third rail portion comprises a height profile that decreases along a portion of its length toward the rear end.

6. The vehicle frame rail of claim 1, wherein the third rail portion comprises a rigid body mount.

7. The vehicle frame rail of claim 1, wherein the third rail portion comprises a rigid mount configured to be attached to a crossmember that comprises a tow mount for attaching to a towing apparatus.

8. The vehicle frame rail of claim 1, wherein the second rail portion comprises a plurality of suspension component mounts.

9. A vehicle frame rail comprising:
a first rail portion comprising a first resistance to deformation;
a second rail portion, attached to the first rail portion, comprising a second resistance to deformation smaller than the first resistance to deformation; and
a third rail portion, attached to the second rail portion, comprising a third resistance to deformation smaller than the second resistance to deformation, wherein:
the third rail portion comprises a rear end of the vehicle frame rail and a frame rail reinforcement positioned adjacent to an inner surface of one or more segments of the third rail portion, and
the frame rail reinforcement comprises a plurality of deformation initiation features comprising at least one of a cutout or a crease.

10. A vehicle frame comprising:
a first rail member and a second rail member, each comprising:
a respective front rail portion, wherein the front rail portion is configured to provide resistance to deformation to protect a battery pack assembly positioned between the first rail member and the second rail member;
a respective middle rail portion affixed to the front rail portion; and
a respective rear rail portion affixed to the respective middle rail portion and structured to mechanically deform when subjected to a threshold impact force, wherein:
the respective rear rail portion comprises a respective rear end of a respective vehicle frame rail and a respective frame rail reinforcement positioned adjacent to an inner surface of one or more segments of the rear rail portion, and
the respective frame rail reinforcement comprises a respective plurality of deformation initiation features comprising at least one of a cutout or a crease.

11. The vehicle frame of claim 10, wherein a rear tow mount apparatus is fixedly attached to at least a rear most crossmember of a plurality of crossmembers connected to each of the first and second rail members, and wherein the rear tow apparatus is positioned such that a rear approaching impacting object would contact the rear tow apparatus before any other feature of the vehicle frame.

12. The vehicle frame of claim 10, wherein a spare wheel mount is fixedly attached to at least one of a plurality of crossmembers connected to each of the first and second rail members, and the spare wheel mount is further structured to mechanically deform such that when a rearmost crossmember feature is impacted by a rear approaching object, the spare wheel mount does not contact a crossmember positioned in front of the spare wheel mount.

13. The vehicle frame of claim 10, wherein each of the first rail member and second rail member comprises a respective plurality of segments of varying thicknesses and wherein each of the respective plurality of segments comprise at least three different thicknesses, wherein a forwardmost segment of each of the respective plurality of segments comprises a thickest profile of the three different thicknesses.

14. The vehicle frame of claim 13, wherein a rearmost segment of each of the respective plurality of segments comprises a thinnest profile of the three different thicknesses.

15. The vehicle frame of claim 14, wherein at least one segment of each of the respective plurality of segments comprises a material different from other segments of each of the respective plurality of segments.

16. The vehicle frame of claim 10, wherein each of the first rail member and second rail member comprises a respective plurality of segments that collectively form the front rail portion, the middle rail portion, and the rear rail portion, and wherein each segment of the respective plurality of segments comprises at least one feature to enable deformation when a tow mount apparatus is impacted by a rear approaching object.

17. The vehicle frame of claim 10, wherein:
the respective frame rail reinforcement of the respective rear rail portion of the first rail member is affixed to at least one internal or external surface of a respective segment comprising the first rail member, wherein the respective frame rail reinforcement of the respective rear rail portion of the first rail member increases resistance to deformation of the first rail member by increasing a thickness of the first rail member; and
the respective frame rail reinforcement of the respective rear rail portion of the second rail member is affixed to at least one internal or external surface of a respective segment comprising the second rail member, wherein the respective frame rail reinforcement of the respective rear rail portion of the second rail member increases resistance to deformation of the second rail member by increasing a thickness of the second rail member.

18. The vehicle frame of claim 10, wherein each of the respective middle rail portions comprise respective features to enable deformation when a mount to attach a tow apparatus is impacted by a rear approaching object.

* * * * *